United States Patent
Matsuoka et al.

(10) Patent No.: US 11,545,308 B2
(45) Date of Patent: Jan. 3, 2023

(54) LIQUID COMPOSITION AND METHOD FOR PRODUCING ELECTROCHEMICAL DEVICE

(71) Applicant: RICOH COMPANY, LTD., Tokyo (JP)

(72) Inventors: Kohji Matsuoka, Kanagawa (JP); Ryuji Higashi, Kanagawa (JP); Masahiro Masuzawa, Kanagawa (JP); Hideo Yanagita, Tokyo (JP); Yuu Zama, Kanagawa (JP); Tomoya Ohmura, Kanagawa (JP); Yusuke Kanno, Kanagawa (JP); Daisuke Nose, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 111 days.

(21) Appl. No.: 16/951,469

(22) Filed: Nov. 18, 2020

(65) Prior Publication Data
US 2021/0159023 A1   May 27, 2021

(30) Foreign Application Priority Data
Nov. 21, 2019   (JP) .............................. JP2019-210551

(51) Int. Cl.
*H01G 11/30* (2013.01)
*H01M 4/04* (2006.01)
(Continued)

(52) U.S. Cl.
CPC .............. *H01G 11/30* (2013.01); *C09D 1/00* (2013.01); *C09D 5/00* (2013.01); *C09D 7/20* (2018.01); *C09D 7/65* (2018.01); *H01G 11/28* (2013.01); *H01G 11/86* (2013.01); *H01M 4/0402* (2013.01); *H01M 50/403* (2021.01); *H01M 50/411* (2021.01); *H01M 50/431* (2021.01);
(Continued)

(58) Field of Classification Search
CPC ........ H01G 11/30; H01G 11/28; H01G 11/86; H01M 4/0402; H01M 2/145; H01M 2/1673; H01M 2004/021; H01M 4/0471; H01M 50/403; H01M 50/46; H01M 50/411; Y02E 60/10; C09D 1/00
See application file for complete search history.

(56) References Cited

U.S. PATENT DOCUMENTS

| | | | |
|---|---|---|---|
| 9,243,179 B2 | 1/2016 | Shiren et al. | |
| 9,873,814 B2 | 1/2018 | Kagata et al. | |

(Continued)

FOREIGN PATENT DOCUMENTS

| | | |
|---|---|---|
| CN | 102130315 | 7/2011 |
| JP | 2006-173001 | 6/2006 |

(Continued)

OTHER PUBLICATIONS

Chinese Office Action dated Sep. 3, 2021 in Chinese Application No. 202011299287.4, with English translation, 19 pages.

*Primary Examiner* — Vishal V Vasisth
(74) *Attorney, Agent, or Firm* — Grüneberg and Myers PLLC (57) ABSTRACT

A liquid composition includes particles and a solvent, wherein a contact angle of the liquid composition with respect to a substrate is greater than a contact angle of the solvent with respect to the substrate, and the contact angle of the substrate with respect to water observed 9 seconds after the substrate comes into contact with the water is 45 degrees to 75 degrees.

9 Claims, 8 Drawing Sheets

$\gamma_S$ ··· SURFACE TENSION OF SOLID
$\gamma_L$ ··· SURFACE TENSION OF LIQUID
$\gamma_{SL}$ ··· SURFACE TENSION OF SOLID AND LIQUID
$\gamma_S = \gamma_L \cdot \cos\theta + \gamma_{SL}$ (51) Int. Cl.
  *H01G 11/28*  (2013.01)
  *H01G 11/86*  (2013.01)
  *H01M 50/46*  (2021.01)
  *H01M 50/403*  (2021.01)
  *C09D 1/00*  (2006.01)
  *C09D 7/65*  (2018.01)
  *H01M 50/431*  (2021.01)
  *H01M 50/443*  (2021.01)
  *H01M 50/446*  (2021.01)
  *H01M 50/411*  (2021.01)
  *C09D 7/20*  (2018.01)
  *C09D 5/00*  (2006.01)
  *H01M 4/02*  (2006.01)

(52) U.S. Cl.
  CPC ....... *H01M 50/443* (2021.01); *H01M 50/446* (2021.01); *H01M 50/46* (2021.01); *H01M 2004/021* (2013.01)

(56) References Cited

U.S. PATENT DOCUMENTS

| | | |
|---|---|---|
| 2008/0118826 A1 | 5/2008 | Shimamura et al. |
| 2011/0306157 A1 | 12/2011 | Wallace et al. |
| 2012/0015232 A1 | 1/2012 | Teshima et al. |
| 2016/0152786 A1 | 6/2016 | Akutsu et al. |

FOREIGN PATENT DOCUMENTS

| | | |
|---|---|---|
| JP | 2007-295222 | 11/2007 |
| JP | 2016-138225 | 8/2016 |
| JP | 2017-088734 | 5/2017 |
| JP | 6206391 | 10/2017 |
| JP | 2018-190693 | 11/2018 |
| JP | 2020-056000 | 4/2020 |

FIG.1

$\gamma_S$ ··· SURFACE TENSION OF SOLID
$\gamma_L$ ··· SURFACE TENSION OF LIQUID
$\gamma_{SL}$ ··· SURFACE TENSION OF SOLID AND LIQUID
$\gamma_S = \gamma_L \cdot \cos\theta + \gamma_{SL}$

LIQUID COMPOSITION AND METHOD FOR PRODUCING ELECTROCHEMICAL DEVICE

CROSS-REFERENCE TO RELATED APPLICATION

The present application is based on and claims priority under 35 U.S.C. § 119 to Japanese Patent Application No. 2019-210551, filed on Nov. 21, 2019, the content of which is incorporated herein by reference in its entirety.

BACKGROUND OF THE INVENTION

1. Field of the Invention

The present disclosure relates to a liquid composition and a method for producing an electrochemical device.

2. Description of the Related Art

Conventionally, electrochemical devices such as lithium ion rechargeable batteries, electric double layer capacitors, lithium ion capacitors, and redox capacitors use paper, non-woven fabrics, and porous films as separators for the purpose of conducting ions while preventing short-circuit between the positive electrode and the negative electrode.

In recent years, an electrode-integrated type separator formed with a separator on an electrode mixture layer has been researched (for example, see Japanese Unexamined Patent Application Publication No. 2006-173001).

In general, the electrode-integrated type separator is formed by applying a liquid composition including particles and a solvent to an electrode mixture layer.

In recent years, for example, white inks containing white color materials such as titanium dioxide are attracting attention as inks that can form color images that cannot be formed by using only conventional color inks such as cyan ink, magenta ink, yellow ink, and black ink.

In addition, when a color image is recorded on a recording medium, such as, e.g., plastic products, metal products, and the like, of which the color of the ground is not necessarily white, a white ink may be used for the purpose of hiding the color of the ground of the recording medium in order to improve the color development of the color image. Also, when a color image is formed on a transparent sheet, a white ink may be used to form a white shielding layer that reduces the transparency of the color image. For this reason, the white ink is required to improve the color development of whiteness when the white ink is attached to the recording medium (for example, see Japanese Unexamined Patent Application Publication No. 2016-138225).

In addition, techniques for correcting, with white ink, images formed with conventional color inks are also studied (for example, see Japanese Unexamined Patent Application Publication No. 2007-295222).

SUMMARY OF THE INVENTION

According to one aspect of the present invention, there is provided a liquid composition including particles and a solvent, wherein a contact angle of the liquid composition with respect to a substrate is greater than a contact angle of the solvent with respect to the substrate, and the contact angle of the substrate with respect to water observed 9 seconds after the substrate comes into contact with the water is 45 degrees to 75 degrees.

DETAILED DESCRIPTION OF THE PREFERRED EMBODIMENTS

According to embodiments of the present invention, it is desired to provide a liquid composition capable of improving the degree of formation of the particle layer on a substrate having a porous structure.

Hereinafter, embodiments for carrying out the present invention are explained.

[Liquid Composition]

A liquid composition according to the present embodiment includes particles and a solvent, and may further include a resin.

A contact angle of a liquid composition according to the present embodiment with respect to a substrate is greater than a contact angle of a solvent with respect to the substrate.

In this case, the contact angle of the substrate with respect to water observed 9 seconds after the substrate comes into contact with the water is 45 degrees to 75 degrees, and the substrate may have a porous structure, or does not have to have the porous structure.

In this specification and claims, the contact angle of the liquid composition with respect to the substrate being greater than the contact angle of the solvent with respect to the substrate means the following case (i) or (ii), or means both of the cases (i) and (ii).

(i) When the substrate includes a porous structure, the contact angle of the liquid composition with respect to the substrate is greater than the contact angle of the solvent with respect to the substrate by 5 degrees or more.

(ii) When the substrate does not include a porous structure, the contact angle of the liquid composition with respect to the substrate is greater than the contact angle of the solvent with respect to the substrate by 0.5 degrees or more.

Specifically, in the case where the substrate includes the porous structure, the contact angle of the liquid composition with respect to the substrate is preferably greater than the contact angle of the solvent with respect to the substrate by 15 degrees or more. In the case where the substrate does not include the porous structure, the contact angle of the liquid composition with respect to the substrate is preferably greater than the contact angle of the solvent with respect to the substrate by 2 degrees or more.

In this case, the contact angle with respect to the substrate is a contact angle observed 9 seconds or 20 seconds after the liquid composition has come into contact with the substrate.

An example of a substrate including a porous structure includes an electrode mixture layer and the like.

An example of a substrate not including a porous structure includes an alkali-free glass substrate and the like.

In this specification and claims, the contact angle means an angle formed, at a position where a free surface of a stationary liquid comes into contact with a solid surface, by the liquid surface and the solid surface (an angle formed inside the liquid) (see "Dictionary of Physics and Chemistry, 4th Edition", Iwanami Shoten Publishers).

Figure 1:
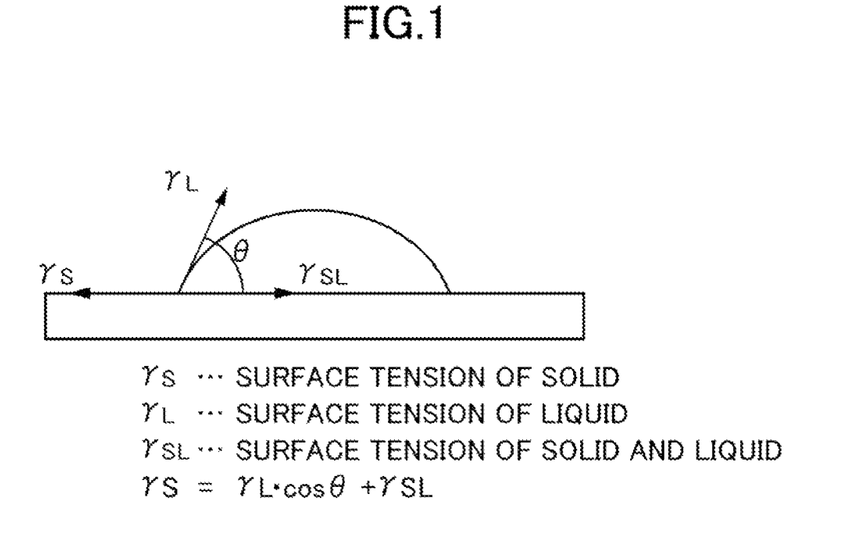
FIG. 1 is a schematic diagram for explaining a definition of a contact angle.

When a liquid is dropped on a surface of a solid, the liquid becomes round due to its surface tension as illustrated in FIG. 1, and the Young equation ($\gamma S = \gamma L \cdot \cos \theta + \gamma SL$) is satisfied. In this case, $\theta$ in the Young equation is the contact angle.

Figure 2A:
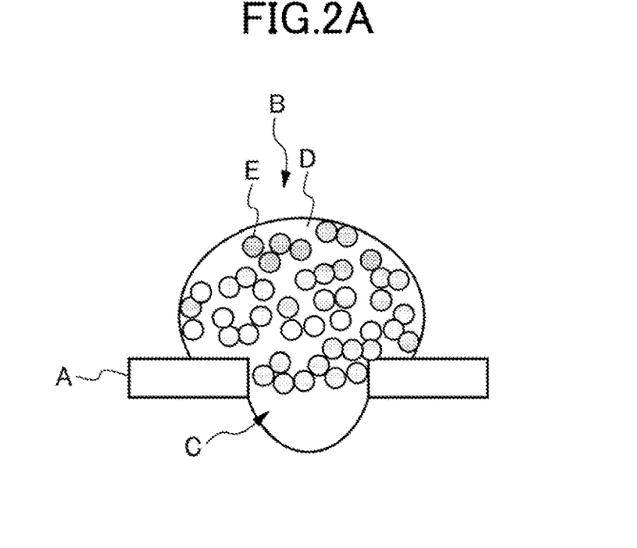
FIGS. 2A to 2C are schematic diagrams illustrating a liquid composition according to the present embodiment discharged onto an electrode mixture layer having a porous structure.
Figure 2B:
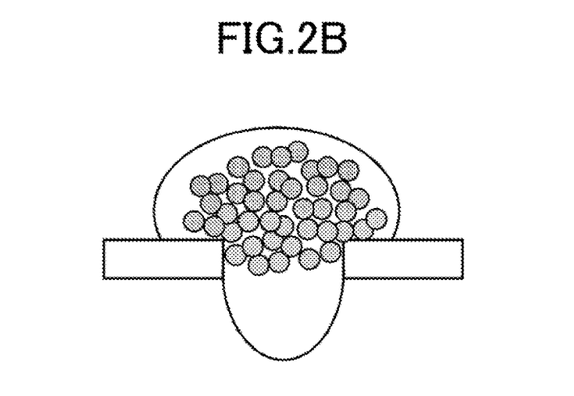
Figure 2C:
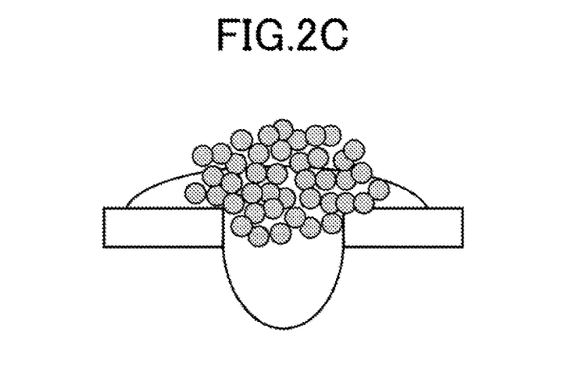

FIGS. 2A to 2C are schematic diagrams illustrating a liquid composition according to the present embodiment discharged onto an electrode mixture layer having a porous structure.

When the liquid composition is discharged to an electrode mixture layer A having a porous structure, at least at a liquid contact target surface of the liquid composition, a droplet B attached to the electrode mixture layer A permeates a pore C of the electrode mixture layer A due to capillary action. In this case, the contact angle of the droplet B with respect to the electrode mixture layer A is greater than the contact angle of a solvent D with respect to the electrode mixture layer A, and therefore, the solvent D permeates the electrode mixture layer A before particles E included in the droplet B (see FIG. 2A) permeate the electrode mixture layer A. At this occasion, a driving force occurs to move the particles E to a substantially central portion of the droplet B, and accordingly, the distances among the particles E included in the droplet B decrease. As a result, the particles E aggregate (see FIG. 2B). Specifically, the particles E are in the aggregated state such that the particles E are unlikely to enter the inside of the pore of the electrode mixture layer A, and even if the solvent D further permeates the electrode mixture layer A, the particles E are prevented from entering the inside of the pore of the electrode mixture layer A (see FIG. 2C).

In this case, the contact angle of the electrode mixture layer A with respect to water observed 9 seconds after the electrode mixture layer A comes into contact with the water is about 50 degrees.

In the electrode mixture layer A before the electrode mixture layer A comes into contact with the electrode mixture layer A, the particles E are dispersed in the solvent D.

The 90% diameter and the median diameter of the particles E mean a diameter in the particle size distribution of the particles E where 90% of the particles E in volume have diameters smaller than this diameter (i.e., the minimum 90% diameter) and a diameter in the particle size distribution of the particles E where 50% of the particles E in volume have diameters smaller than this diameter (i.e., the minimum median diameter), respectively, measured by a laser diffraction apparatus.

In this case, the 90% diameter is used as an index of excess or lack of coarse particles due to poor distribution and reaggregation due to excessive dispersion, i.e., an index of the dispersibility.

The median diameter is used as an index of dispersion stability because the median diameter sensitively responds to a very small dispersion environment. In other words, when the median diameter is greater, the particles E are more likely to settle and the dispersion is less likely to be maintained, as compared with the case where the median diameter is smaller.

Where the median diameter of the liquid composition according to the present embodiment is denoted as $D_{50}$ [μm], and the 90% diameter is denoted as $D_{90}$ [μm], it is preferable to satisfy the following expressions.

$$D_{90} < 5$$

$$1 < D_{50}$$

When $D_{90} < 5$ is satisfied, poor dispersion and excess or lack of dispersion of the particles E are less likely to occur, and the dispersibility of the liquid composition according to the present embodiment improves. When $1 < D_{50}$ is satisfied, the particles E are less likely to settle, and the dispersion stability of the liquid composition according to the present embodiment improves.

The liquid composition according to the present embodiment can be produced by dispersing particles in the solvent.

For example, rotation and revolution motion-type and cooling-type Nano Pulverizer NP-100 (produced by THINKY CORPORATION), LABSTAR Mini LMZ015 of wet bead mill type (produced by Ashizawa Finetech Ltd.), and the like can be used to disperse the particles in the solvent.

The liquid composition according to the present embodiment can be used as a liquid composition for image formation.

Also, the liquid composition according to the present embodiment can be used for producing separator-integrated type electrodes.

<Particles>

The particles are preferably inorganic particles.

Examples of materials constituting the inorganic particles include alumina, silica, magnesium oxide, hydroxyapatite, magnesium hydroxide, titanium oxide, and the like, and also include a combination of two or more of the above materials.

For example, when the particles are alumina, the liquid composition according to the present embodiment can be used as white ink for image formation.

<Solvent>

Examples of solvents include isopropyl alcohol (IPA), 2-pyrrolidone, hexylene glycol (HG), ethyl lactate (EL), 2-butanone (MEK), 2-heptane, 2-heptanone, diacetone alcohol (DAA), dimethyl sulfoxide (DMSO), ethylene glycol (EG), 1-methyl-2-pyrrolidone (NMP), 2-octanol, and the like, and also include a combination of two or more of the above solvents.

The SPp value (i.e., polarity parameter of Hansen solubility parameters (HSP) explained later) of the solvent is preferably 13 or less, and more preferably 10 or less. When the SPp value of solvent is 13 or less, the degree of formation of the particle layer is improved. When the SPp value of the solvent is 10 or less, the degree of formation of the particle layer is further improved.

<Resin>

The resin may include a binder resin.

Examples of binder resins include styrene butadiene resin (SBR), acrylic resin, urethane resin, polyvinylpyrrolidone (PVP), polyvinylidene fluoride (PVDF), and the like, and also include a combination of two or more of the above binder resins.

The forms of resins are not particularly limited, and examples of resins include dissolution, particles, and the like.

The resin may include a polymer compound.

Examples of polymer compounds include high-molecular weight compounds containing a high-molecular weight polycarboxylic acid, a salt thereof, a polyoxyethylene group, a polyoxypropylene group, and the like.

Examples of commercially-available products of polymer compounds include: SC-0708A, SC-0505K, HKM-050A, HKM-150A, SC-1015F, and AKM-0531 (which are produced by NOF CORPORATION); NOPCO SPARSE 092, SN-DISPERSANT 9228, and SN-DISPERSANT 2190 (which are produced by SAN NOPCO LIMITED); and DISPER-BYK103, DISPER-BYK2000, DISPER-BYK2001 (which are produced by BYK-Chemie GmbH), and the like.

[Method for Producing Electrochemical Device]

A method for producing an electrochemical device according to the present embodiment includes forming an electrode mixture layer on an electrode substrate and forming a particle layer by discharging the liquid composition according to the present embodiment onto an electrode mixture layer.

Note that the electrode mixture layer and the particle layer may be formed on a single surface of the electrode substrate or may be formed on both surfaces of the electrode substrate.

The electrode mixture layer can be formed by applying a liquid composition for the electrode mixture layer.

The liquid composition for the electrode mixture layer includes an active material and a dispersion medium, and may further include a conductive material, a dispersant, and the like as necessary.

Examples of methods for applying the liquid composition for the electrode mixture layer include a comma coater method, a die coater method, a curtain coating method, a spray coating method, a liquid discharge method, and the like.

An example of a method for applying the liquid composition according to the present embodiment includes a liquid discharge method and the like.

<Method for Producing Negative Electrode>

Figure 3:
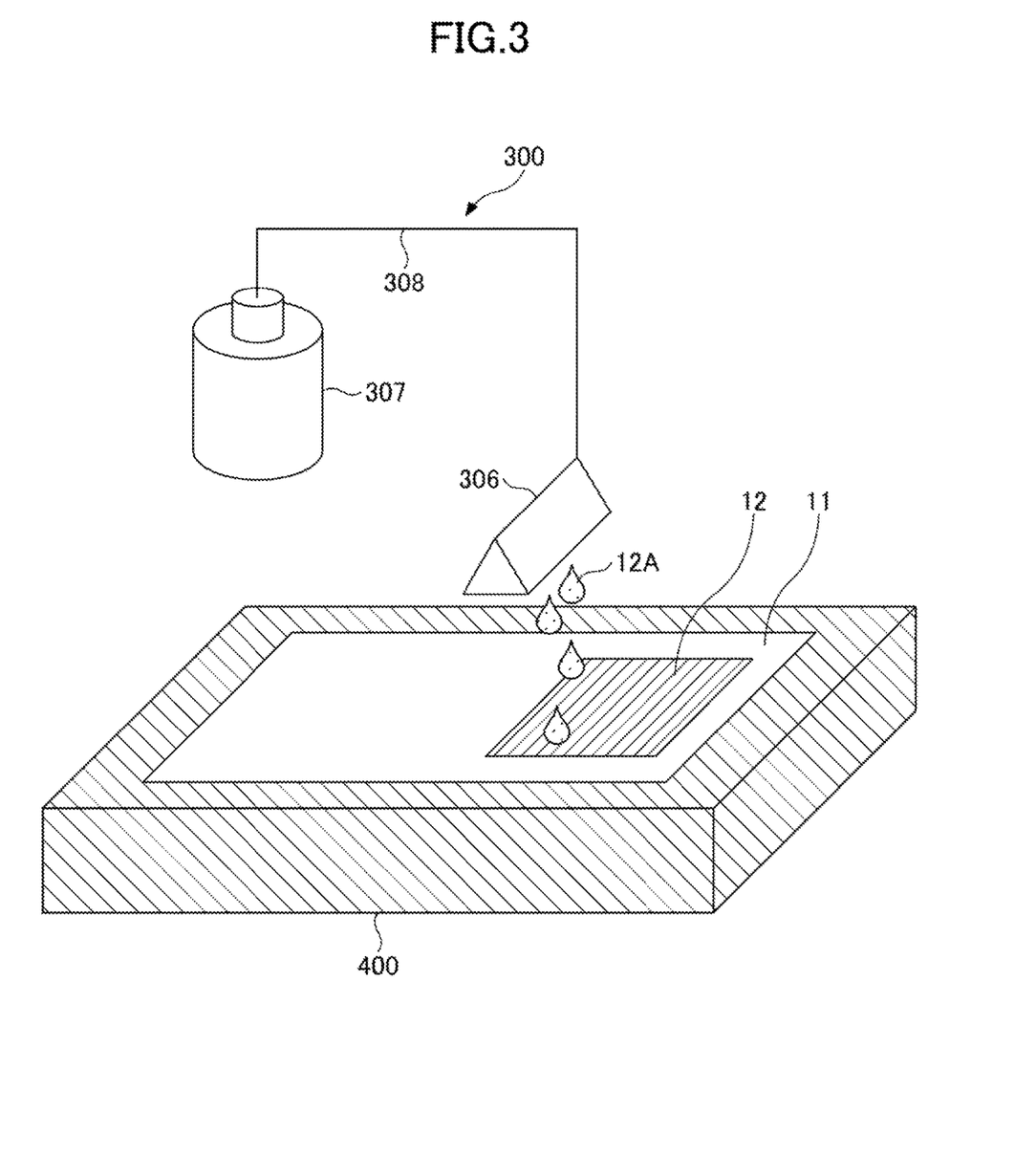
FIG. 3 is a schematic diagram illustrating an example of a method for producing a negative electrode according to the present embodiment.

FIG. 3 is a schematic diagram illustrating an example of a method for producing a negative electrode according to the present embodiment.

The method for producing the negative electrode causes a liquid discharge apparatus 300 to perform the steps including forming a negative electrode mixture layer 12 by discharging a liquid composition 12A on a negative electrode substrate 11 and forming a particle layer by discharging the liquid composition according to the present embodiment on the negative electrode mixture layer 12.

In this case, the liquid composition 12A includes a negative electrode active material and a dispersion medium.

The liquid composition 12A is accumulated in a tank 307, and is supplied from the tank 307 via a tube 308 to a liquid discharge head 306.

Also, the liquid discharge apparatus 300 may be provided with a mechanism for capping a nozzle for preventing the nozzle from being dried when the liquid composition 12A is not discharged from the liquid discharge head 306.

In producing the negative electrode, the negative electrode substrate 11 is placed on a stage 400 that can be heated, and thereafter, the droplets of the liquid composition 12A are discharged on the negative electrode substrate 11, and thereafter the droplets are heated to form the negative electrode mixture layer 12. At this occasion, the stage 400 may be moved, or the liquid discharge head 306 may be moved.

In heating the liquid composition 12A discharged on the negative electrode substrate 11, the liquid composition 12A may be heated by the stage 400, or may be heated by a heating mechanism other than the stage 400.

The heating mechanism is not particularly limited as long as the heating mechanism does not come into direct contact with the liquid composition 12A, and examples of the heating mechanism include a resistance heater, an infrared heater, a fan heater, and the like.

Note that a plurality of heating mechanisms may be provided.

The heating temperature is not particularly limited, and is preferably in a range of 70 to 150 degrees Celsius from the viewpoint of energy consumption.

When the liquid composition 12A discharged on the negative electrode substrate 11 is heated, an ultraviolet light may be emitted.

Next, in a manner similar to the negative electrode mixture layer 12, a particle layer is formed, and a negative electrode is produced.

Figure 4:
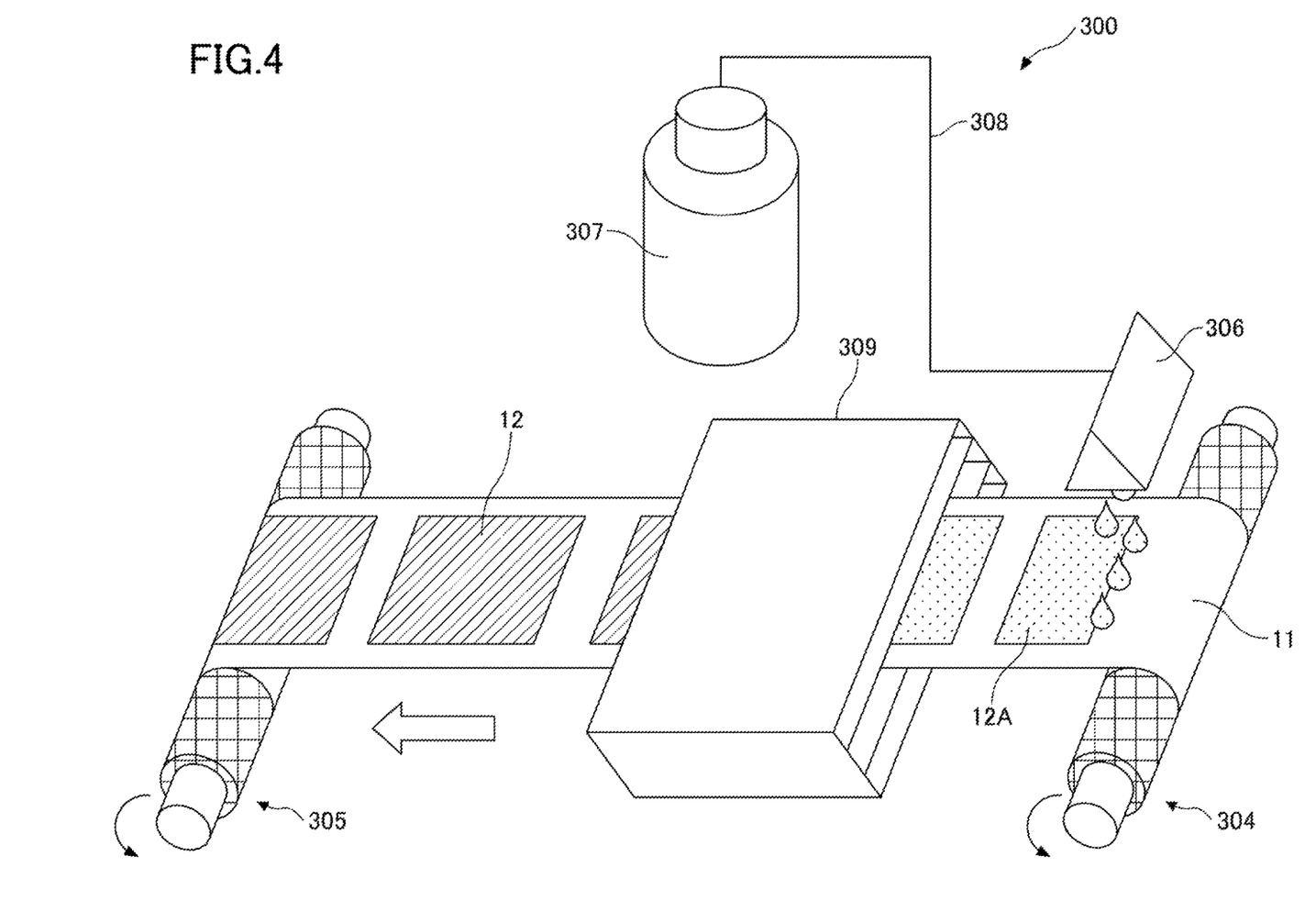
FIG. 4 is a schematic diagram illustrating another example of a method for producing a negative electrode according to the present embodiment.

FIG. 4 is a schematic diagram illustrating another example of a method for producing a negative electrode according to the present embodiment.

The method for producing the negative electrode causes the liquid discharge apparatus 300 to perform the steps including forming a negative electrode mixture layer 12 by discharging a liquid composition 12A on a negative electrode substrate 11 and forming a particle layer by discharging the liquid composition according to the present embodiment on the negative electrode mixture layer 12.

First, a long and narrow negative electrode substrate 11 is prepared. Then, the negative electrode substrate 11 is wrapped around a cylindrical core, and a feeding roller 304 and a receiving roller 305 are set in such an arrangement that a side where the negative electrode mixture layer 12 is formed is on the upper side in FIG. 4. In this case, the feeding roller 304 and the receiving roller 305 rotate counterclockwise, and the negative electrode substrate 11 is transported from the right to the left in FIG. 4. Then, the liquid discharge head 306 arranged above the negative electrode substrate 11 between the feeding roller 304 and the receiving roller 305 discharges the droplets of the liquid composition 12A to the conveyed negative electrode substrate 11. The droplets of the liquid composition 12A are discharged in such a manner that the droplets cover at least a part of the negative electrode substrate 11.

A plurality of liquid discharge heads 306 may be provided in a direction substantially horizontal or substantially perpendicular to the conveying direction of the negative electrode substrate 11.

Next, the negative electrode substrate 11 on which the liquid composition 12A has been discharged is conveyed to a heating mechanism 309 by the feeding roller 304 and the receiving roller 305. As a result, the liquid composition 12A on the negative electrode substrate 11 is dried, and the negative electrode mixture layer 12 is formed.

The heating mechanism 309 is not particularly limited as long as the heating mechanism 309 does not come into direct contact with the liquid composition 12A, and examples of the heating mechanism 309 include a resistance heater, an infrared heater, a fan heater, and the like.

The heating mechanism 309 may be installed on either the upper or lower side of the negative electrode substrate 11, or a plurality of heating mechanisms 309 may be provided.

The heating temperature is not particularly limited, and is preferably in a range of 70 to 150 degrees Celsius from the viewpoint of energy consumption.

In heating the liquid composition 12A discharged on the negative electrode substrate 11, the ultraviolet light may be emitted.

Next, in a manner similar to the negative electrode mixture layer 12, a particle layer is formed, and a negative electrode is produced.

Thereafter, the negative electrode is cut into a desired size by punching and the like.

Figure 5:
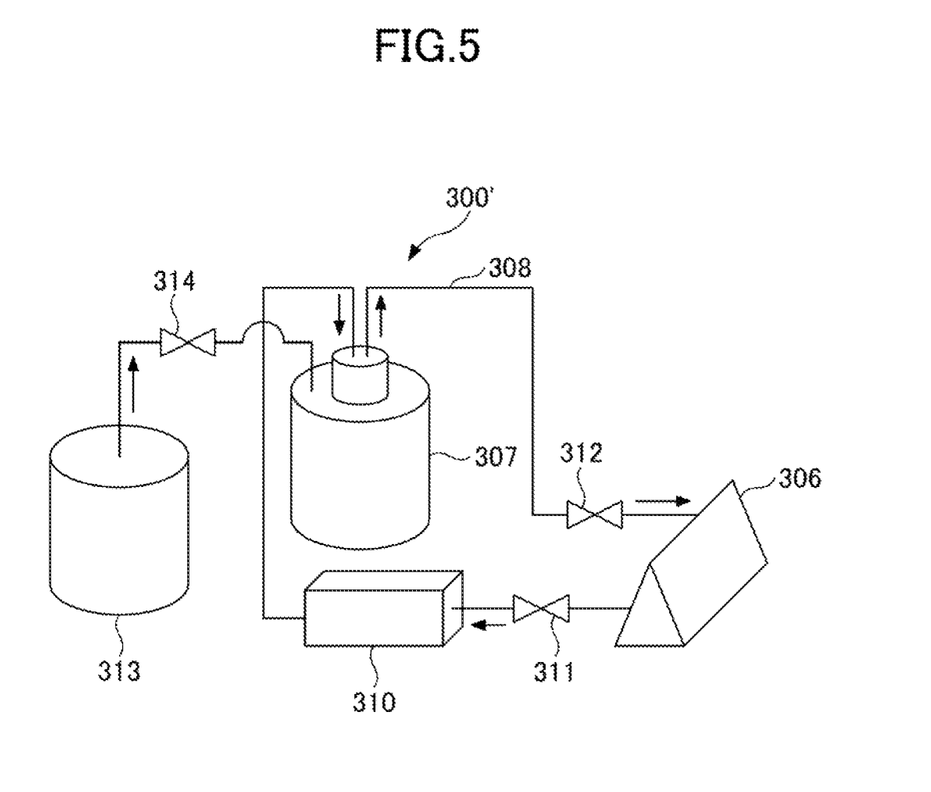
FIG. 5 is a schematic diagram illustrating a liquid discharge apparatus 300' according to a modified embodiment of a liquid discharge apparatus 300 illustrated in FIGS. 3 and 4.

FIG. 5 is a schematic diagram illustrating a liquid discharge apparatus 300' according to a modified embodiment of the liquid discharge apparatus 300 illustrated in FIGS. 3 and 4.

The liquid discharge apparatus 300' controls a pump 310 and valves 311, 312 to allow the liquid composition 12A to circulate through a liquid discharge head 306, a tank 307, and a tube 308.

In addition, the liquid discharge apparatus 300' includes an external tank 313, and when the liquid composition 12A in the tank 307 decreases, the pump 310 and the valves 311, 312, 314 are controlled to supply the liquid composition 12A from the external tank 313 to the tank 307.

With the liquid discharge apparatus 300, 300', the liquid composition 12A can be discharged to a desired position of the negative electrode substrate 11. With the liquid discharge apparatus 300, 300', the surfaces of the negative electrode substrate 11 and the negative electrode mixture layer 12 in contact with each other in a vertical direction can be bonded. Further, with the liquid discharge apparatus 300, 300', the thickness of the negative electrode mixture layer 12 can be uniformized.

<Method for Producing Positive Electrode>

The method for producing the positive electrode is the same as the method for producing the negative electrode except that a liquid composition including a positive electrode active material and a dispersion medium is discharged on a positive electrode substrate.

It should be noted that the particle layer can be formed in a positive electrode and/or a negative electrode.

<Active Material>

The active material may include a positive electrode active material or a negative electrode active material.

The positive electrode active material or the negative electrode active material may be used alone, or two or more types of positive electrode active materials or negative electrode active materials may be used in combination.

The positive electrode active material is not particularly limited as long as the positive electrode active material can insert or release alkali metal ions, and the positive electrode active material may be an alkali metal-containing transition metal compound.

Examples of alkali metal-containing transition metal compounds include lithium-containing transition metal compounds such as composite oxides containing lithium and one or more elements selected from the group consisting of cobalt, manganese, nickel, chromium, iron, and vanadium.

Examples of lithium-containing transition metal compounds include lithium cobalt oxide, lithium nickel oxide, lithium manganate, and the like.

The alkali metal-containing transition metal compound may be a polyanionic compound having an $XO_4$ tetrahedron (X=P, S, As, Mo, W, Si, and the like) in the crystal structure. Among them, lithium-containing transition metal phosphoric acid compounds such as lithium iron phosphate and lithium vanadium phosphate are preferable in terms of cycle characteristics, and lithium vanadium phosphate is particularly preferable in terms of lithium diffusion coefficient and output characteristics.

In terms of electron conductivity, the polyanionic compound is preferably composited by coating its surface with a conductive material such as a carbon material.

The negative electrode active material is not particularly limited as long as the negative electrode active material can insert or release alkali metal ions, and the negative electrode active material may be a carbon material containing graphite having a graphite-type crystal structure.

Examples of carbon materials include natural graphite, artificial graphite, non-graphitizable carbon (hard carbon), and graphitizable carbon (soft carbon).

Examples of negative electrode active materials other than the carbon materials include lithium titanate, titanium oxide, and the like.

From the viewpoint of the energy density of non-aqueous power storage devices, the negative electrode active material preferably includes a high-capacity material such as silicon, tin, silicon alloy, tin alloy, silicon oxide, silicon nitride, tin oxide, and the like.

<Dispersion Medium>

Examples of dispersion media include: aqueous dispersion media such as water, ethylene glycol, propylene glycol, and the like; and organic dispersion media such as N-Methyl-2-pyrrolidone, 2-pyrrolidone, cyclohexanone, butyl acetate, mesitylene, 2-n-butoxymethanol, 2-dimethylethanol, N, N-dimethylacetamide, and the like, and also include a combination of two or more of the above aqueous dispersion media or organic dispersion media.

<Conductive Material>

Examples of conductive materials include carbon materials such as conductive carbon blacks produced by a furnace method, an acetylene method, a gasification method, and the like, carbon nanofibers, carbon nanotubes, graphene, graphite particles, and the like. Examples of conductive materials other than the carbon materials include metal particles and metal fibers of aluminum and the like. The conductive materials may be composited with an active material in advance.

<Dispersant>

Examples of dispersants include polymer compounds such as polycarboxylate-based dispersants, formalin naphthalenesulfonate condensate-based dispersants, polyethylene glycol, partial alkyl ester polycarboxylate-based dispersants, polyether-based dispersants, polyalkylene polyamine-based dispersants, and the like; surfactants such as alkyl sulfonate-based dispersants, quaternary ammonium salt-based dispersants, high-molecular weight alcohol alkylene oxide-based dispersants, polyhydric alcohol ester-based dispersants, alkyl polyamine-based dispersants, and the like; and inorganic dispersants such as a polyphosphate dispersant.

<Electrochemical Device>

Figure 6:
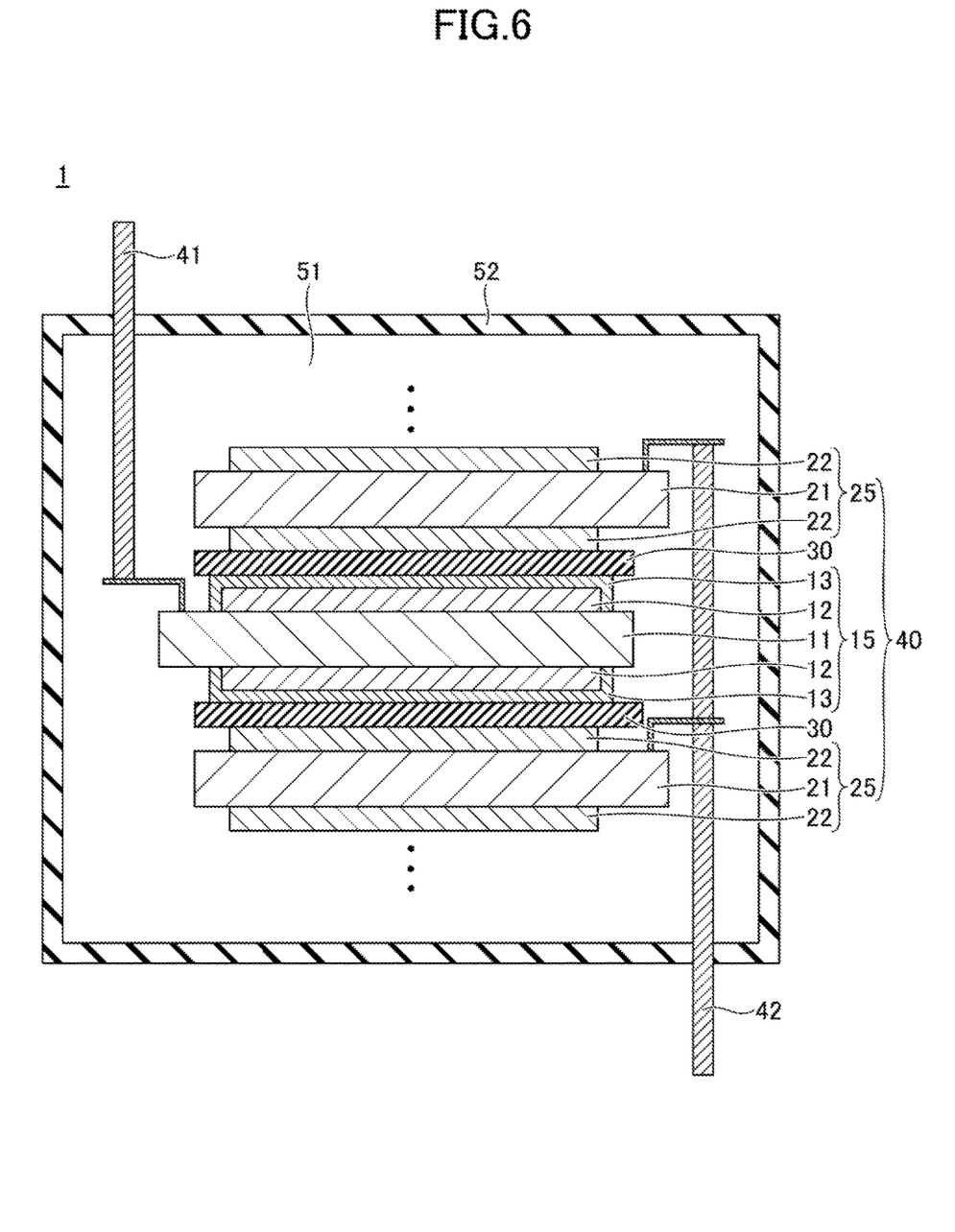
FIG. 6 is a cross sectional view illustrating an example of an electrochemical device produced by the method for producing the electrochemical device according to the present embodiment.

FIG. 6 is a cross sectional view illustrating an example of an electrochemical device 1 produced by the method for producing the electrochemical device 1 according to the present embodiment.

In the electrochemical device 1, an electrolyte layer 51 constituted by an aqueous electrolyte solution or a non-aqueous electrolyte is formed on an electrode device 40, and is sealed by a housing 52. In the electrochemical device 1, lead wires 41, 42 are extended to the outside of the housing 52.

In the electrode device 40, a negative electrode 15 and a positive electrode 25 are stacked with a separator 30 interposed between them. In this case, the positive electrodes 25 is stacked on each side of the negative electrode 15. The negative electrode substrate 11 is connected to the lead wire 41. The positive electrode substrate 21 is connected to the lead wire 42.

In the negative electrode 15, a negative electrode mixture layer 12 and a particle layer 13 are formed in this order on each side of the negative electrode substrate 11.

In the positive electrode 25, a positive electrode mixture layer 22 is formed on each side of the positive electrode substrate 21.

Alternatively, a positive electrode mixture layer 22 and a particle layer 13 may be formed in this order on each side of the positive electrode substrate 21. In this case, the particle layer 13 may be omitted as necessary.

It should be noted that the numbers of negative electrode 15 and positive electrodes 25 stacked in the electrode device 40 are not particularly limited.

In the electrode device 40, the number of negative electrodes 15 and the number of positive electrodes 25 may be the same or may be different from each other.

The electrochemical device 1 may include other components as necessary.

The shape of the electrochemical device 1 is not particularly limited, and examples of shapes of the electrochemical device 1 include a laminated type, a cylinder type including sheet electrodes and separators structured in a spiral form, a cylinder type having an inside-out structure including a combination of pellet electrodes and separators, and a coin type obtained by stacking pellet electrodes and separators, and the like.

For example, the electrochemical device 1 may be an aqueous power storage device and a non-aqueous power storage device.

<Separator>

The separator 30 is provided between a negative electrode 15 and a positive electrode 25 as necessary in order to prevent short-circuit between the negative electrode 15 and the positive electrode 25.

The separator 30 may be made of, for example, paper such as kraft paper, vinylon mixed paper, and synthetic pulp mixed paper, Cellophane, a polyethylene grafted membrane, polyolefin non-woven fabric such as polypropylene meltblown non-woven fabric, polyamide non-woven fabric, glass fiber non-woven fabric, a microporous film, and the like.

The size of the separator 30 is not particularly limited, as long as the separator 30 can be used for an electrochemical device.

The separator 30 may have a single layer structure or a stacked structure.

In a case where a solid electrolyte is used as a non-aqueous electrolyte, the separator 30 may be omitted.

<Electrolyte Aqueous Solution>

Examples of electrolyte salts constituting the electrolyte aqueous solution include sodium hydroxide, potassium hydroxide, sodium chloride, potassium chloride, ammonium chloride, zinc chloride, zinc acetate, zinc bromide, zinc iodide, zinc tartrate, zinc perchloride, and the like.

<Non-Aqueous Electrolyte>

The non-aqueous electrolyte may be a solid electrolyte or a non-aqueous electrolyte solution.

In this case, the non-aqueous electrolyte solution is an electrolyte solution in which an electrolyte salt is dissolved in a non-aqueous solvent.

<Non-Aqueous Solvent>

The non-aqueous solvent is not particularly limited, and for example, the non-aqueous solvent is preferably an aprotic organic solvent.

Examples of aprotic organic solvents include carbonate-based organic solvents such as a chain carbonate or a cyclic carbonate. Among them, the chain carbonate is preferable because of its high capacity to dissolve the electrolyte salt.

Further, the aprotic organic solvent preferably has a low viscosity.

Examples of the chain carbonate include dimethyl carbonate (DMC), diethyl carbonate (DEC), methyl ethyl carbonate (EMC), and the like.

The content of the chain carbonate in the non-aqueous solvent is preferably 50% or more by mass. When the content of the chain carbonate in the non-aqueous solvent is 50% or more by mass, even if the non-aqueous solvent other than the chain carbonate is a cyclic substance having a high dielectric constant (for example, cyclic carbonate, cyclic ester), the content of the cyclic substance is reduced. For this reason, even if a non-aqueous electrolyte solution having a high concentration of 2 M (mol/L) or more is prepared, the viscosity of the non-aqueous electrolyte solution decreases, and the permeation and ion diffusion of the non-aqueous electrolyte solution into the electrode improve.

Examples of the cyclic carbonate include propylene carbonate (PC), ethylene carbonate (EC), butylene carbonate (BC), vinylene carbonate (VC) and the like.

Examples of non-aqueous solvents other than carbonate-based organic solvents include ester-based organic solvents such as cyclic esters and chain esters, ether-based organic solvents such as cyclic ethers and chain ethers, and the like.

Examples of the cyclic ester include γ-butyrolactone (γBL), 2-methyl-γ-butyrolactone, acetyl-γ-butyrolactone, γ-valerolactone, and the like.

Examples of chain esters include alkyl ester propionates, dialkyl ester malonates, alkyl ester acetates (for example, methyl acetate (MA), ethyl acetate), alkyl ester formates (for example, methyl formate (MF), ethyl formate), and the like.

Examples of the cyclic ether include tetrahydrofuran, alkyl tetrahydrofuran, alkoxy tetrahydrofuran, dialkoxytetrahydrofuran, 1,3-dioxolane, alkyl-1,3-dioxolane, 1,4-dioxolane, and the like.

Examples of the chain ether include 1,2-dimethoxyietan (DME), diethyl ether, ethylene glycol dialkyl ether, diethylene glycol dialkyl ether, triethylene glycol dialkyl ether, tetraethylene glycol dialkyl ether, and the like.

<Electrolyte Salt>

The electrolyte salt is not particularly limited as long as the electrolyte salt has a high ionic conductivity and can be dissolved in the non-aqueous solvent.

The electrolyte salt preferably includes a halogen atom.

Examples of cations constituting the electrolyte salt include lithium ions.

Examples of anions constituting the electrolyte salt include $BF_4^-$, $PF_6^-$, $AsF_6^-$, $CF_3SO_3^-$, $(CF_3SO_2)_2N^-$, $(C_2F_5SO_2)_2N^-$, and the like.

The lithium salt is not particularly limited and can be appropriately selected according to the purpose. Examples of the lithium salt include lithium hexafluorophosphate ($LiPF_6$), lithium borofluoride ($LiBF_4$), lithium hexafluoride (LiAsF$_6$), lithium trifluoromethsulfonate (LiCF$_3$SO$_3$), lithium bis (trifluoromethylsulfonyl) imide (LiN(CF$_3$SO$_2$)$_2$), lithium bis (pentafluoroethylsulfonyl) imide (LiN(C$_2$F$_5$SO$_2$)$_2$), and the like. Among them, LiPF$_6$ is preferable from the viewpoint of ionic conductivity, and LiBF$_4$ is preferable from the viewpoint of stability.

The electrolyte salt may be used alone, or two or more types of electrolyte salts may be used in combination.

The concentration of the electrolyte salt in the non-aqueous electrolyte solution can be appropriately selected according to the purpose, but in a case where the non-aqueous power storage device is a swing type, the concentration is preferably 1 mol/L to 2 mol/L, and in a case where the non-aqueous power storage device is a reserve type, the concentration is preferably 2 mol/L to 4 mol/L.

<Application of Electrochemical Device>

The application of the electrochemical device is not particularly limited, and examples to which the electrochemical device can be applied include laptop computers, pen input personal computers, mobile personal computers, electronic book players, mobile phones, mobile facsimiles, mobile copiers, mobile printers, portable audio players, camcorders, liquid crystal display televisions, handheld cleaners, portable compact disks (CDs), mini disks, walkie-talkies, personal digital assistants (PDAs), calculators, memory cards, portable tape recorders, radio receivers, backup power supplies, motors, lighting fixtures, toys, game consoles, clocks, strobes, cameras, and the like.

EXAMPLES

Examples of the present invention are described below, but the present invention is not limited to the examples. Unless otherwise specified, "parts" and "%" are based on mass.

Examples 1-1 to 1-6

Using the rotation and revolution motion-type and cooling-type Nano Pulverizer NP-100 (produced by THINKY CORPORATION), 56% of particles, 2.8% of resin, and 41.2% of solvent were dispersed, and thereafter, the obtained solution was diluted by a diluting solvent to obtain liquid compositions of which the contents of the particles are 40%, 35%, 30%, 25%, 20%, and 10%.

In this case, alumina particles AKP-3000 (produced by Sumitomo Chemical Co., Ltd.) are used as the particles, high-molecular weight polycarboxylic acid SC-0708A (produced by NOF CORPORATION) was used as the resin, and isopropyl alcohol (IPA) was used as the dispersion solvent and the diluting solvent.

In addition, in order to derive $\Delta\theta_1$ and $\Delta\theta_2$, a liquid composition including only the solvent was prepared.

Examples 2-1 to 2-3 and Comparative Examples 2-4 to 2-6

In a manner similar to Examples 1-1 to 1-6 except that a mixed solvent including IPA and 2-pyrrolidone was used as the diluting solvent, liquid compositions were obtained. In this case, the mass ratio of IPA and 2-pyrrolidone in the diluting solvent was adjusted so that the mass ratio of IPA and 2-pyrrolidone in the liquid composition became 3:2.

In addition, in order to derive $\Delta\theta_1$ and $\Delta\theta_2$, a liquid composition including only the solvent was prepared.

Example 3-1 to 3-3 and Comparative Examples 3-4 to 3-6

In a manner similar to Examples 2-1 to 2-3 and Comparative Examples 2-4 to 2-6 except that hexylene glycol (HG) was used instead of 2-pyrrolidone, liquid compositions were obtained.

In addition, in order to derive $\Delta\theta_1$ and $\Delta\theta_e$, a liquid composition including only the solvent was prepared.

Examples 4-1 to 4-5 and Comparative Examples 4-6

In a manner similar to Examples 1-1 to 1-6 except that Ethyl lactate (EL) was used instead of IPA, liquid compositions were obtained.

In addition, in order to derive $\Delta\theta_1$ and $\Delta\theta_2$, a liquid composition including only the solvent was prepared.

Examples 5-1 to 5-5 and Comparative Example 5-6

In a manner similar to Examples 4-1 to 4-6 except that a mixed solvent including EL and HG was used as the diluting solvent, liquid compositions were obtained. In this case, the mass ratio of EL and HG in the diluting solvent was adjusted so that the mass ratio of EL and HG in the liquid composition became 3:2.

In addition, in order to derive $\Delta\theta_1$ and $\Delta\theta_2$, a liquid composition including only the solvent was prepared.

Examples 6-1 to 6-4 and Comparative Examples 6-5, 6-6

In a manner similar to Examples 5-1 to 5-6 except that 2-Butanone (MEK) was used instead of EL, liquid compositions were obtained.

In addition, in order to derive $\Delta\theta_1$ and $\Delta\theta_2$, a liquid composition including only the solvent was prepared.

Examples 7-1 to 7-6

In a manner similar to Examples 5-1 to 5-6 except that 2-Heptanone was used instead of EL, liquid compositions were obtained.

In addition, in order to derive $\Delta\theta_1$ and $\Delta\theta_2$, a liquid composition including only the solvent was prepared.

Examples 8-1 to 8-6

In a manner similar to Examples 1-1 to 1-6 except that Diacetone alcohol (DAA) was used instead of IPA, liquid compositions were obtained.

In addition, in order to derive $\Delta\theta_1$ and $\Delta\theta_2$, a liquid composition including only the solvent was prepared.

Example 9-1 to 9-6

In a manner similar to Examples 8-1 to 8-6 except that a mixed solvent including DAA and HG was used as the diluting solvent, liquid compositions were obtained. In this case, the mass ratio of DAA and HG in the diluting solvent was adjusted so that the mass ratio of DAA and HG in the liquid composition became 3:2.

In addition, in order to derive $\Delta\theta_1$ and $\Delta\theta_2$, a liquid composition including only the solvent was prepared.

Examples 10-1 to 10-3 and Comparative Examples 10-4 to 10-6

In a manner similar to Examples 1-1 to 1-6 except that high-molecular weight ammonium polycarboxylate salt HKM-150A (produced by NOF CORPORATION) was used as the resin, dimethyl sulfoxide (DMSO) was used as the dispersion solvent, and a mixed solvent including DMSO and ethylene glycol (EG) was used as the diluting solvent, liquid compositions were obtained. In this case, the mass ratio of DMSO and HG in the diluting solvent was adjusted so that the mass ratio of DMSO and HG in the liquid composition became 3:2.

In addition, in order to derive $\Delta\theta_1$ and $\Delta\theta_2$, a liquid composition including only the solvent was prepared.

Examples 11-1 to 11-3 and Comparative Examples 11-4 to 11-6

In a manner similar to Examples 10-1 to 10-6 except that NMP was used instead of DMSO, liquid compositions were obtained.

In addition, in order to derive $\Delta\theta_1$ and $\Delta\theta_2$, a liquid composition including only the solvent was prepared.

<Preparing of Porous Substrate for Negative Electrode>

With a comma coater, a slurry for a negative electrode mixture layer obtained by kneading negative electrode active material SCMG-XRs (Showa Denko K. K.), water, and resin was applied to a copper foil serving as a negative electrode substrate, and thereafter the slurry on the copper foil was dried to form the negative electrode mixture layer. Subsequently, the negative electrode mixture layer was pressed to attain a density of 1.6±0.1 mg/cm³. As a result, a porous substrate for the negative electrode was obtained.

<Contact Angle>

First, a spring (No. 562) for DropMaster series was set in a push-in part of a syringe (No. 586) for DropMaster series. The liquid composition of each of the Examples and Comparative Examples was loaded to the syringe at an amount capable of forming a droplet, and a Teflon (registered trademark)-coated needle (No. 4707) for the DropMaster series was set. Subsequently, after about 2 μL of the liquid composition was pushed out from the coated needle to form a droplet, the droplet was dropped to the negative electrode mixture layer of the porous substrate for the negative electrode or to an alkali-free glass substrate EAGLEXG 50×0.7×50 (produced by Corning Incorporated). Next, a contact angle gauge of Drop Master series (produced by Kyowa Interface Science Co., Ltd.) was used to measure, at 23 degrees Celsius, a contact angle observed 9 seconds or 20 seconds after the droplet came into contact with the negative electrode mixture layer or the alkali-free glass substrate. Analysis software FAMAS (interFAce Measurement & Analysis System) version 3.7.2 was used to analyze the contact angle. Specifically, the contact angle was determined using a method called a θ/2 method including measuring the left and right contact angles and adopting the average.

The contact angle of the negative electrode mixture layer with respect to water observed 9 seconds after the water comes into contact with the negative electrode mixture layer was about 50 degrees.

The contact angle of the alkali-free glass substrate with respect to water observed 9 seconds after the water comes into contact with the alkali-free glass substrate was about 70 degrees.

When the contact angles of the negative electrode mixture layer and the alkali-free glass substrate with respect to water were measured, weakly acidic ion-exchanged water was used. Therefore, in this specification and claims, the contact angle with respect to water means the contact angle with respect to the weakly acidic ion-exchanged water.

In this case, the contact angles of the negative electrode mixture layer and the alkali-free glass substrate with respect to water observed 9 seconds after the water comes into contact with the negative electrode mixture layer and the alkali-free glass substrate respectively were measured and analyzed according to a measurement method and an analysis method similar to the above measurement method and the analysis method of the contact angles.

<Evaluation of $\Delta\theta_1$>

When a difference $\Delta\theta_1$ between the contact angle of the solvent constituting a component of the liquid composition with respect to the negative electrode mixture layer and the contact angle of the liquid composition with respect to the negative electrode mixture layer is less than 5 degrees, the difference $\Delta\theta_1$ was evaluated as "Poor". When the difference $\Delta\theta_1$ was equal to or more than 5 degrees and less than 15 degrees, the difference $\Delta\theta_1$ was evaluated as "Good". When the difference $\Delta\theta_1$ was equal to or more than 15 degrees, the difference $\Delta\theta_1$ was evaluated as "Excellent".

<Evaluation of $\Delta\theta_2$>

When a difference $\Delta\theta_2$ between the contact angle of the solvent constituting the liquid composition with respect to the alkali-free glass and the contact angle of the liquid composition with respect to the alkali-free glass is less than 0.5 degrees, the difference $\Delta\theta_2$ is evaluated as "Poor". When the difference $\Delta\theta_2$ is equal to or more than 0.5 degrees and less than 2 degrees, the difference $\Delta\theta_2$ is evaluated as "Good". When the difference $\Delta\theta_2$ is equal to or more than 2 degrees, the difference $\Delta\theta_2$ is evaluated as "Excellent".

<Preparing of Separator-Integrated Type Negative Electrode>

Using a liquid discharge apparatus EV2500 (produced by Ricoh Company, Ltd.) and a liquid discharge head MH5421F (produced by Ricoh Company, Ltd.), a liquid composition was discharged on the negative electrode mixture layer of the porous substrate for the negative electrode at a resolution of 600 dpi×1200 dpi with multiple pulses, i.e., two pulses, to form a liquid film. Subsequently, the liquid film was dried to form a particle layer with 1.0±0.2 mg/cm². As a result, the separator-integrated type negative electrode was obtained. The conditions for forming the particle layer are not limited to the above conditions.

<The Degree of Formation of Particle Layer>

A luminance L* of a surface of the separator-integrated type negative electrode where a particle layer was formed was measured with a color identification device RM200 (produced by X-Rite, Inc.) to evaluate the degree of formation of the particle layer on the electrode mixture layer. When the luminance L* was equal to or more than 73, the degree of formation of the particle layer was evaluated as "Excellent". When the luminance L* was equal to or more than 70 and less than 73, the degree of formation of the particle layer was evaluated as "Good". When the luminance L was less than 70, the degree of formation of the particle layer was evaluated as "Poor".

In this case, when the luminance L was less than 70, permeation of the particles into the electrode mixture layer and generation of coffee rings were not reduced, i.e., unevenness was not reduced. When the luminance L* was equal to or more than 70 and was less than 73, the permeation of the particles into the electrode mixture layer and the unevenness were reduced. When the luminance L* was equal to or more than 73, the permeation of the particles into the electrode mixture layer and the unevenness are more greatly reduced.

To supplement the case where the luminance L* was less than 70, the negative electrode mixture layer having the porous structure is in black (L*=40 to 48). Therefore, when the permeation of the particles into the electrode mixture layer and the generation of coffee rings were not reduced, the luminance L* was less than 70. When the luminance L* was less than 70, the degradation in the quality such as a reduction in the thickness of the separator occurred, and in a case where an electrochemical device is assumed, the degradation in the quality, e.g., a reduction in the electric resistance between the positive electrode (negative electrode) and the negative electrode (positive electrode)-integrated type separator and the generation of the coffee rings, may occur, and there is a concern that an unevenness may occur in the resistance of the separator formed on the electrode mixture layer.

This evaluation index based on the luminance matches an evaluation index as to whether a liquid composition has a performance that correlates with the luminance required as white ink for image formation, i.e., as to whether the liquid composition is suitable as white ink for image formation.

Tables 1, 2 show evaluation results of the degrees of formations of the particle layers.

TABLE 1

| | Content of Particles [%] | Resin | Solvent | Evaluation of $\Delta \theta_1$ | | Evaluation of $\Delta \theta_2$ | | The degree of formation of particle layer |
|---|---|---|---|---|---|---|---|---|
| | | | | 9 seconds after contact | 20 seconds after contact | 9 seconds after contact | 20 seconds after contact | |
| Example 1-1 | 40 | SC-0708A | IPA | Excellent | Excellent | Excellent | Excellent | Excellent |
| Example 1-2 | 35 | SC-0708A | IPA | Excellent | Excellent | Good | Good | Excellent |
| Example 1-3 | 30 | SC-0708A | IPA | Excellent | Excellent | Good | Good | Excellent |
| Example 1-4 | 25 | SC-0708A | IPA | Excellent | Excellent | Poor | Poor | Excellent |
| Example 1-5 | 20 | SC-0708A | IPA | Excellent | Good | Poor | Poor | Good |
| Example 1-6 | 10 | SC-0708A | IPA | Good | Good | Poor | Poor | Good |
| Example 2-1 | 40 | SC-0708A | IPA/2-Pyrrolidone | Excellent | Excellent | Excellent | Excellent | Excellent |
| Example 2-2 | 35 | SC-0708A | IPA/2-Pyrrolidone | Good | Good | Good | Good | Excellent |
| Example 2-3 | 30 | SC-0708A | IPA/2-Pyrrolidone | Good | Good | Poor | Poor | Good |
| Comparative Example 2-4 | 25 | SC-0708A | IPA/2-Pyrrolidone | Poor | Poor | Poor | Poor | Poor |
| Comparative Example 2-5 | 20 | SC-0708A | IPA/2-Pyrrolidone | Poor | Poor | Poor | Poor | Poor |
| Comparative Example 2-6 | 10 | SC-0708A | IPA/2-Pyrrolidone | Poor | Poor | Poor | Poor | Poor |
| Example 3-1 | 40 | SC-0708A | IPA/HG | Excellent | Excellent | Excellent | Excellent | Excellent |
| Example 3-2 | 35 | SC-0708A | IPA/HG | Excellent | Excellent | Good | Good | Excellent |
| Example 3-3 | 30 | SC-0708A | IPA/HG | Good | Good | Good | Good | Good |
| Comparative Example 3-4 | 25 | SC-0708A | IPA/HG | Poor | Poor | Poor | Poor | Poor |
| Comparative Example 3-5 | 20 | SC-0708A | IPA/HG | Poor | Poor | Poor | Poor | Poor |
| Comparative Example 3-6 | 10 | SC-0708A | IPA/HG | Poor | Poor | Poor | Poor | Poor |
| Example 4-1 | 40 | SC-0708A | EL | Excellent | Excellent | Excellent | Excellent | Excellent |
| Example 4-2 | 35 | SC-0708A | EL | Excellent | Excellent | Good | Good | Excellent |
| Example 4-3 | 30 | SC-0708A | EL | Good | Good | Good | Good | Excellent |
| Example 4-4 | 25 | SC-0708A | EL | Good | Good | Poor | Poor | Good |
| Example 4-5 | 20 | SC-0708A | EL | Good | Good | Poor | Poor | Good |
| Comparative Example 4-6 | 10 | SC-0708A | EL | Poor | Poor | Poor | Poor | Poor |
| Example 5-1 | 40 | SC-0708A | EL/HG | Excellent | Excellent | Excellent | Excellent | Excellent |
| Example 5-2 | 35 | SC-0708A | EL/HG | Good | Good | Good | Good | Excellent |
| Example 5-3 | 30 | SC-0708A | EL/HG | Good | Good | Good | Good | Good |
| Example 5-4 | 25 | SC-0708A | EL/HG | Good | Good | Good | Good | Good |
| Example 5-5 | 20 | SC-0708A | EL/HG | Good | Good | Poor | Poor | Good |
| Comparative Example 5-6 | 10 | SC-0708A | EL/HG | Poor | Poor | Poor | Poor | Poor |
| Example 6-1 | 40 | SC-0708A | MEK/HG | Good | Good | Good | Good | Excellent |
| Example 6-2 | 35 | SC-0708A | MEK/HG | Good | Good | Good | Good | Good |
| Example 6-3 | 30 | SC-0708A | MEK/HG | Good | Good | Good | Good | Good |
| Example 6-4 | 25 | SC-0708A | MEK/HG | Good | Good | Poor | Poor | Good |
| Comparative Example 6-5 | 20 | SC-0708A | MEK/HG | Poor | Poor | Poor | Poor | Poor |
| Comparative Example 6-6 | 10 | SC-0708A | MEK/HG | Poor | Poor | Poor | Poor | Poor |

TABLE 2

|  | Content of Particles [%] | Resin | Solvent | Evaluation of Δθ₁ 9 seconds after contact | Evaluation of Δθ₁ 20 seconds after contact | Evaluation of Δθ₂ 9 seconds after contact | Evaluation of Δθ₂ 20 seconds after contact | The degree of formation of particle layer |
|---|---|---|---|---|---|---|---|---|
| Example 7-1 | 40 | SC-0708A | 2-Heptanone/HG | Excellent | Excellent | Excellent | Excellent | Excellent |
| Example 7-2 | 35 | SC-0708A | 2-Heptanone/HG | Excellent | Excellent | Excellent | Good | Excellent |
| Example 7-3 | 30 | SC-0708A | 2-Heptanone/HG | Good | Good | Good | Good | Good |
| Example 7-4 | 25 | SC-0708A | 2-Heptanone/HG | Good | Good | Good | Good | Good |
| Example 7-5 | 20 | SC-0708A | 2-Heptanone/HG | Good | Good | Good | Good | Good |
| Example 7-6 | 10 | SC-0708A | 2-Heptanone/HG | Good | Good | Good | Good | Good |
| Example 8-1 | 40 | SC-0708A | DAA | Excellent | Excellent | Excellent | Excellent | Excellent |
| Example 8-2 | 35 | SC-0708A | DAA | Excellent | Excellent | Good | Good | Excellent |
| Example 8-3 | 30 | SC-0708A | DAA | Excellent | Excellent | Good | Good | Excellent |
| Example 8-4 | 25 | SC-0708A | DAA | Good | Good | Good | Good | Good |
| Example 8-5 | 20 | SC-0708A | DAA | Good | Good | Poor | Poor | Good |
| Example 8-6 | 10 | SC-0708A | DAA | Good | Good | Poor | Poor | Good |
| Example 9-1 | 40 | SC-0708A | DAA/HG | Excellent | Excellent | Excellent | Excellent | Excellent |
| Example 9-2 | 35 | SC-0708A | DAA/HG | Excellent | Excellent | Excellent | Excellent | Excellent |
| Example 9-3 | 30 | SC-0708A | DAA/HG | Excellent | Excellent | Good | Good | Excellent |
| Example 9-4 | 25 | SC-0708A | DAA/HG | Good | Good | Poor | Poor | Good |
| Example 9-5 | 20 | SC-0708A | DAA/HG | Good | Good | Poor | Poor | Good |
| Example 9-6 | 10 | SC-0708A | DAA/HG | Good | Good | Poor | Poor | Good |
| Example 10-1 | 40 | HKM-150A | DMSO/EG | Good | Good | Poor | Poor | Excellent |
| Example 10-2 | 35 | HKM-150A | DMSO/EG | Good | Good | Poor | Poor | Excellent |
| Example 10-3 | 30 | HKM-150A | DMSO/EG | Good | Good | Poor | Poor | Good |
| Comparative Example 10-4 | 25 | HKM-150A | DMSO/EG | Poor | Poor | Poor | Poor | Poor |
| Comparative Example 10-5 | 20 | HKM-150A | DMSO/EG | Poor | Poor | Poor | Poor | Poor |
| Comparative Example 10-6 | 10 | HKM-150A | DMSO/EG | Poor | Poor | Poor | Poor | Poor |
| Example 11-1 | 40 | HKM-150A | NMP/EG | Good | Good | Poor | Poor | Excellent |
| Example 11-2 | 35 | HKM-150A | NMP/EG | Good | Good | Poor | Poor | Excellent |
| Example 11-3 | 30 | HKM-150A | NMP/EG | Good | Good | Poor | Poor | Good |
| Comparative Example 11-4 | 25 | HKM-150A | NMP/EG | Poor | Poor | Poor | Poor | Poor |
| Comparative Example 11-5 | 20 | HKM-150A | NMP/EG | Poor | Poor | Poor | Poor | Poor |
| Comparative Example 11-6 | 10 | HKM-150A | NMP/EG | Poor | Poor | Poor | Poor | Poor |

Table 1, 2 show that the degrees of formations of the particle layers by the liquid compositions according to the Examples were either "Excellent" or "Good", and the levels of the luminance were not reduced.

In contrast, all of the evaluations of the differences $\Delta\theta_1$, $\Delta\theta_2$ of the liquid compositions according to the Comparative Examples observed 9 seconds or 20 seconds after the liquid compositions come into contact were "Poor". In other words, the degrees of formations of the particle layers were low, the permeations of the particles included in the liquid compositions into the electrode mixture layers having the porous structures and the unevenness were not reduced, and the levels of luminance decreased.

<Relationship Between HSP Value and $\Delta\theta_1$ of Solvent Constituting Liquid Composition of which the Content of Particles is 40%>

Hansen solubility parameters (HSP) of the solvent are constituted by a dispersion force parameter (SPd value), a polarity parameter (SPp value), and a hydrogen bond parameter (SPh value).

Figure 7:
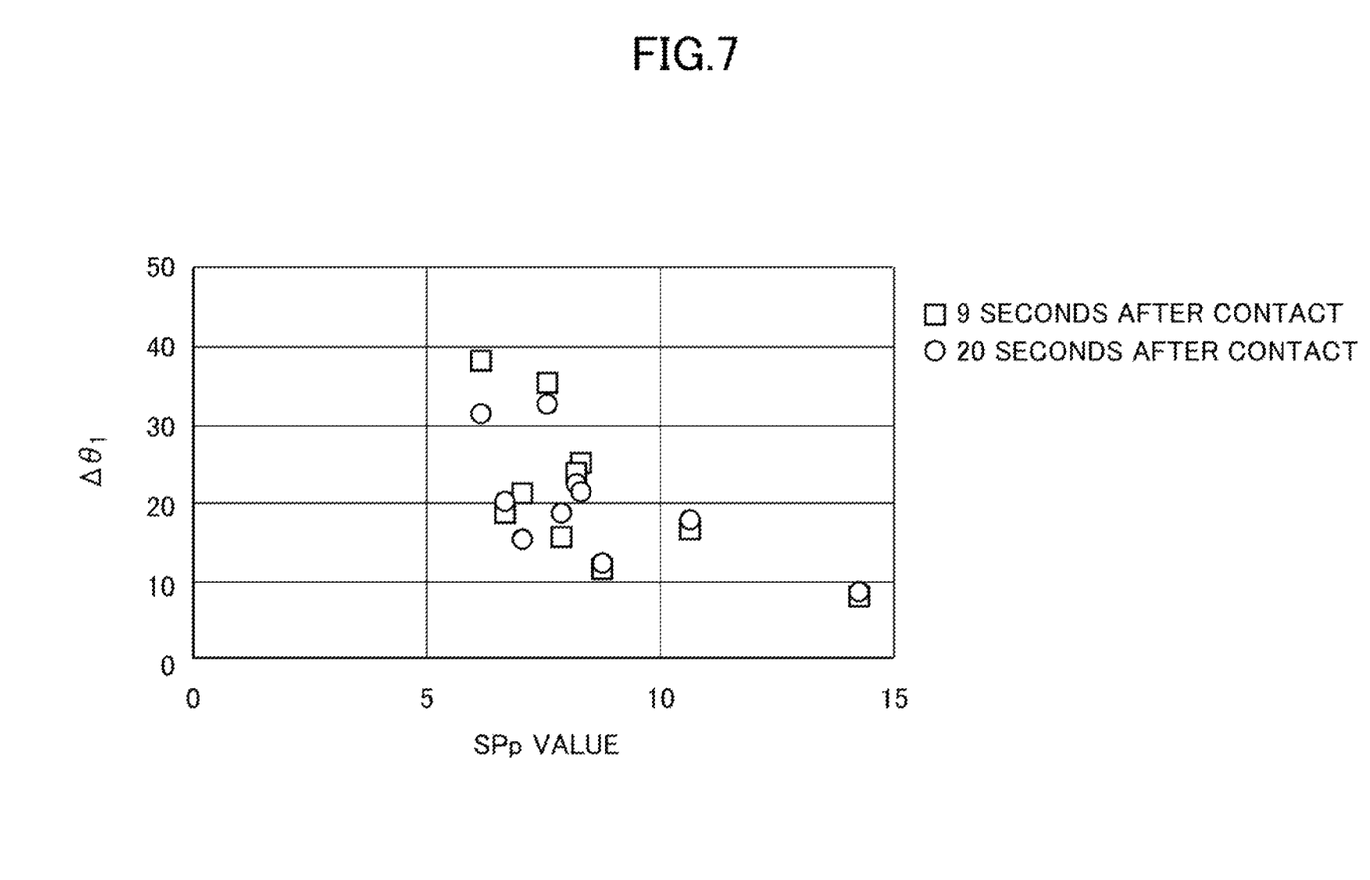
FIG. 7 is a graph illustrating a relationship between SPp values and differences $\Delta\theta_1$ of solvents constituting liquid compositions of which the content of particles was 40%.

FIG. 7 is a graph illustrating a relationship between the SPp values and the differences $\Delta\theta_1$ of solvents constituting liquid compositions of which the content of particles was 40%.

Figure 8:
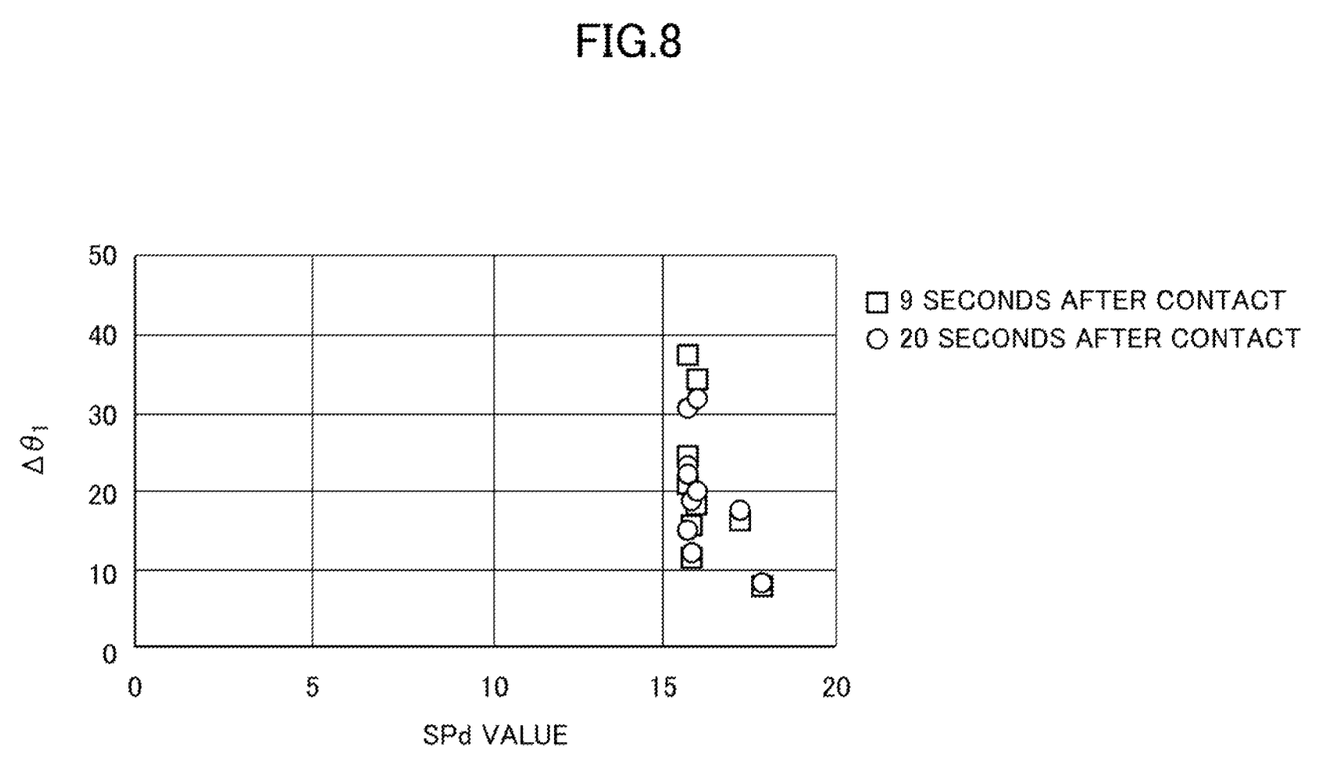
FIG. 8 is a graph illustrating a relationship between SPd values and the differences $\Delta\theta_1$ of the solvents constituting the liquid compositions of which the content of particles was 40%.

FIG. 8 is a graph illustrating a relationship between the SPd values and the differences $\Delta\theta_1$ of the solvents constituting the liquid compositions of which the content of particles was 40%.

The SPp value and the SPd value of the solvent were calculated based on the mass ratio of the solvents.

It can be understood from FIG. 7 and FIG. 8 that the SPp values and the SPd values of the solvents constituting the liquid compositions correlate with the differences $\Delta\theta_1$ observed 9 seconds and 20 seconds after the contact, i.e., the degrees of formations of the particle layers. As compared with the SPd values, the SPp values are more closely related to the differences $\Delta\theta_1$ observed 9 seconds and 20 seconds after the contact, i.e., the degrees of formations of the particle layers. Specifically, the differences $\Delta\theta_1$ observed 9 seconds and 20 seconds after the contact tend to increase in accordance with the decrease in the SPp value of the solvent constituting the liquid composition. In other words, when a highly polar solvent is used, it is expected that the particles are likely to permeate the negative electrode mixture layer.

According to embodiments of the present disclosure, a liquid composition capable of improving the degree of formation of the particle layer on a substrate having a porous structure can be provided.

What is claimed is:
1. A liquid composition, comprising:
   particles; and
   a solvent,
   wherein a contact angle of the liquid composition with respect to a substrate is greater than a contact angle of the solvent with respect to the substrate, and the contact angle of the substrate with respect to water observed 9 seconds after the substrate comes into contact with the water is 45 degrees to 75 degrees, wherein when the substrate has a porous structure, the contact angle of the liquid composition with respect to the substrate is greater than the contact angle of the solvent with respect to the substrate by 5 degrees or more, and both the contact angle of the liquid composition and the contact angle of the solvent are defined as either a contact angle observed 9 seconds after contact with the substrate or a contact angle observed 20 seconds after contact with the substrate, and wherein when the substrate does not have a porous structure, the contact angle of the liquid composition with respect to the substrate is greater than the contact angle of the solvent with respect to the substrate by 0.5 degrees or more, and wherein both the contact angle of the liquid composition and the contact angle of the solvent are defined as either a contact angle observed 9 seconds after contact with the substrate or a contact angle observed 20 seconds after contact with the substrate.

2. The liquid composition according to claim 1, wherein the particles include inorganic particles.

3. A liquid composition, comprising:

particles; and a solvent, wherein a polarity parameter SPp of Hansen solubility parameter of the solvent is 13 $(mJ/m^3)^{0.5}$ or less, wherein when a substrate contacted with the liquid composition has a porous structure a contact angle of the liquid composition with respect to the substrate is greater than a contact angle of the solvent with respect to the substrate by 5 degrees or more, and both the contact angle of the liquid composition and the contact angle of the solvent are defined as either a contact angle observed 9 seconds after contact with the substrate or a contact angle observed 20 seconds after contact with the substrate, and wherein when the substrate contacted with the liquid composition does not have a porous structure, the contact angle of the liquid composition with respect to the substrate is greater than the contact angle of the solvent with respect to the substrate by 0.5 degrees or more, and wherein both the contact angle of the liquid composition and the contact angle of the solvent are defined as either a contact angle observed 9 seconds after contact with the substrate or a contact angle observed 20 seconds after contact with the substrate.

4. The liquid composition according to claim 1, wherein the liquid composition is white ink.

5. The liquid composition according to claim 1, wherein the liquid composition is used for producing an electrode integrated with a separator.

6. The liquid composition according to claim 1, wherein the solvent is selected from the group consisting of isopropyl alcohol (IPA)/2 pyrrolidone; IPA/hexylene glycol (HG); ethyl lactate (EL); EL/HG; 2-butanone (MEK)/HG; 2-heptanone/HG; diacetone alcohol (DAA); DAA/HG; dimethyl sulfoxide (DMSO)/ethylene glycol (EG); and 1-methyl-2-pyrrolidone (NMP)/EG.

7. The liquid composition according to claim 3, wherein the solvent is selected from the group consisting of isopropyl alcohol (IPA)/2 pyrrolidone; IPA/hexylene glycol (HG); ethyl lactate (EL); EL/HG; 2-butanone (MEK)/HG; 2-heptanone/HG; diacetone alcohol (DAA); DAA/HG; dimethyl sulfoxide (DMSO)/ethylene glycol (EG); and 1-methyl-2-pyrrolidone (NMP)/EG.

8. The liquid composition according to claim 1, wherein a content of the particles is 30 to 40%.

9. The liquid composition according to claim 3, wherein SPd value of the solvent is between 15 $(mJ/m^3)^{0.5}$ and 20 $(mJ/m^3)^{0.5}$.

* * * * *